(12) United States Patent
Lohner et al.

(10) Patent No.: US 6,382,344 B1
(45) Date of Patent: May 7, 2002

(54) STEERING SYSTEM FOR A VEHICLE

(75) Inventors: Herbert Lohner, Friolzheim; Peter Dominke, Bietigheim-Bissingen; Chi-Thuan Cao, Korntal-Muenchingen; Klaus-Dieter Leimbach, Moeglingen; Werner Harter, Illingen; Mathias Hommel, Wolfsburg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,116
(22) PCT Filed: Mar. 20, 1999
(86) PCT No.: PCT/DE99/00801
§ 371 Date: Mar. 16, 2001
§ 102(e) Date: Mar. 16, 2001
(87) PCT Pub. No.: WO99/67120
PCT Pub. Date: Dec. 29, 1999

(30) Foreign Application Priority Data

Jun. 23, 1998 (DE) .......................................... 198 27 869

(51) Int. Cl.$^7$ ................................................ B62D 5/04
(52) U.S. Cl. ..................................... 180/444; 74/388 PS
(58) Field of Search ................................. 180/444, 443, 180/446; 318/9; 74/388 PS

(56) References Cited

U.S. PATENT DOCUMENTS

| RE23,673 E | * | 6/1953 | Penrose |
| 2,931,239 A | * | 4/1960 | Dietrich |
| 4,416,345 A | * | 11/1983 | Barthelemy |
| 4,582,155 A | * | 4/1986 | Ohe |
| 4,751,976 A | * | 6/1988 | Higuchi et al. |

\* cited by examiner

Primary Examiner—Anne Marie Boehler
(74) Attorney, Agent, or Firm—Robert E. Greigg

(57) ABSTRACT

A steering system for a vehicle, having a steering wheel, a steering gear and a steering module, disposed between them, for superimposed steering engagement by a controlled electric motor. The electric motor has an input shaft connected to the steering wheel and an output shaft connected to the steering gear. For the sake of structurally simplifying the steering module, the electric motor is in direct engagement, in line with a clutch that can be engaged and disengaged, with the input shaft via a first gear, and the electric motor is in direct engagement with the output shaft via a second gear.

14 Claims, 1 Drawing Sheet

STEERING SYSTEM FOR A VEHICLE

CROSS-REFERENCE TO RELATED APPLICATIONS

This application is a 35 USC 371 application of PCT/DE 99/00801 filed on Mar. 20, 1999.

PRIOR ART

The invention is based on a steering system for a vehicle.

In a known steering system of this type (German Patent Disclosure DE 40 31 316 A1), the actuator has two planetary gears, each with one sun wheel, one ring gear, and planet wheels positioned between the sun wheel and the ring gear. The input shaft of the actuator, acted upon by the driver via the steering wheel, is the axis of the sun wheel of the first planetary gear, and the output shaft of the actuator that actuates the steering gear is the axis of the sun wheel of the second planetary gear. By the driver's actions at the steering wheel, the planet wheels of the first planetary gear, the axes of which are connected to the planet wheels of the second planetary gear, are set into motion. The latter planet wheels in turn engage the second sun wheel and the ring gear, forming the actuator housing, of the second planetary gear. The output power of the electric motor is transmitted to the ring gear of the first planetary gear via a second input shaft of the actuator, and this shaft carries a worm. With this actuator, it is possible both to achieve steering support to the driver during steering (power steering) and also, with additional steering signals, to vary the steering of the vehicle independently of the driver, so that both driving safety and driving comfort are improved.

ADVANTAGES OF THE INVENTION

The steering system of the invention an advantage of reducing the engineering costs of the actuator considerably, while preserving the same functionality of the steering system. Instead of two planet wheel gears, only two simple step-down or step-gears, which can preferably be embodied as gear drives, and an electromagnetic clutch are present. The electric motor is integrated into itself and forms a compact structural unit with it that is preassembled in complete form and then inserted into the power flow from the steering column to the steering gear. Two operating modes are realized by the engagement and disengagement of the clutch. With the clutch closed, the electric motor generates a torque that is superimposed on the torque generated by the driver at the steering wheel, and power-controlled vehicle guidance is thus made possible. With the clutch open, the electric motor, on the basis of steering signals, superimposes a steering angle on the wheels, thus effecting vehicle stabilization that the driver cannot alter. As in the known steering system, there is no effect on the steering wheel. Because of the simple gears, only a few gear wheels mesh, and because the tooth play is slight, the steering play in the steering system is extremely slight. With the clutch open, it is furthermore possible in a fixedly defined angular range about the steering wheel angular position, to achieve the operating state called "steer by wire", that is, purely motor-controlled steering without any mechanical connection between the steering wheel and the steering gear.

Advantageous refinements and improvements to the steering system defined hereinafter are possible with the provisions recited wherein.

BRIEF DESCRIPTION OF THE DRAWING

The invention is described in further detail in the ensuing description, in conjunction with an exemplary embodiment shown in the different figures. The drawings, each schematically, show the following.

DESCRIPTION OF THE EXEMPLARY EMBODIMENT

Figure 1:
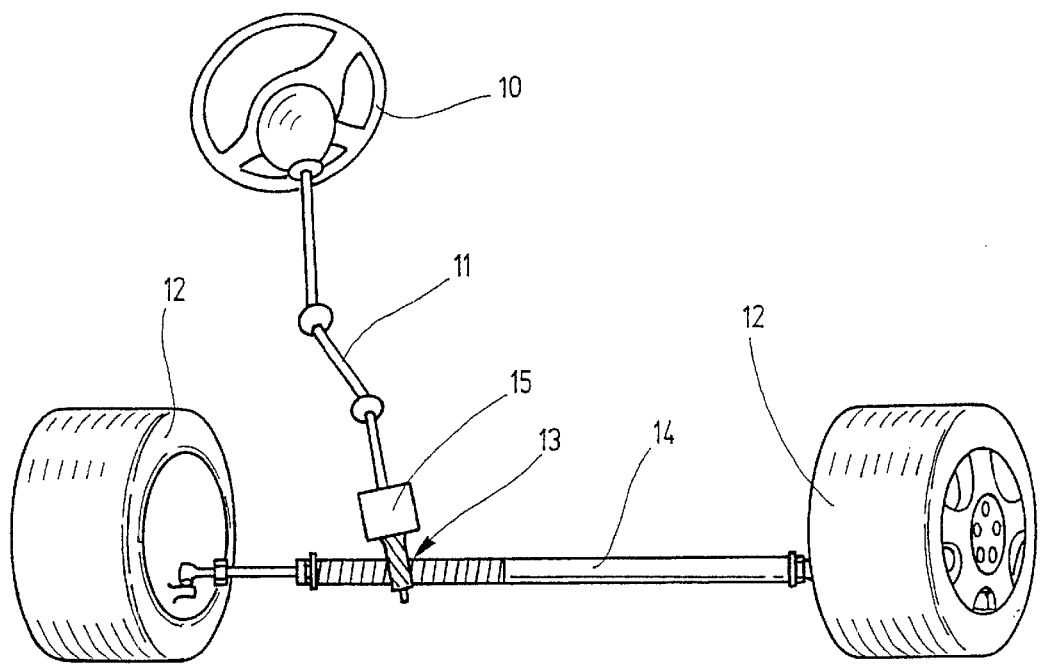
FIG. 1, a perspective view of a steering system of a motor vehicle.

The steering system for a motor vehicle, sketched in perspective in FIG. 1, has a steering wheel 10 with a steering shaft 11 and a steering gear 13 that acts on the front wheels 12 of the motor vehicle and that adjusts the steerable front wheels 12 in accordance with the motions of the steering wheel, via a steering tie rod 14. In sectionally divided steering shaft 11 between the steering wheel 10 and the steering gear 13, there is an actuator or steering module 15, which superimposes an additional angle on the steering wheel angle, as a result of which the steering angle of the front wheels 12 can be varied independently of the steering wheel angle. By means of this steering module 15, advantages are attained in terms of driving dynamics, driving safety and driving comfort, and at the same time power-assisted steering by the driver is achieved.

Figure 2:
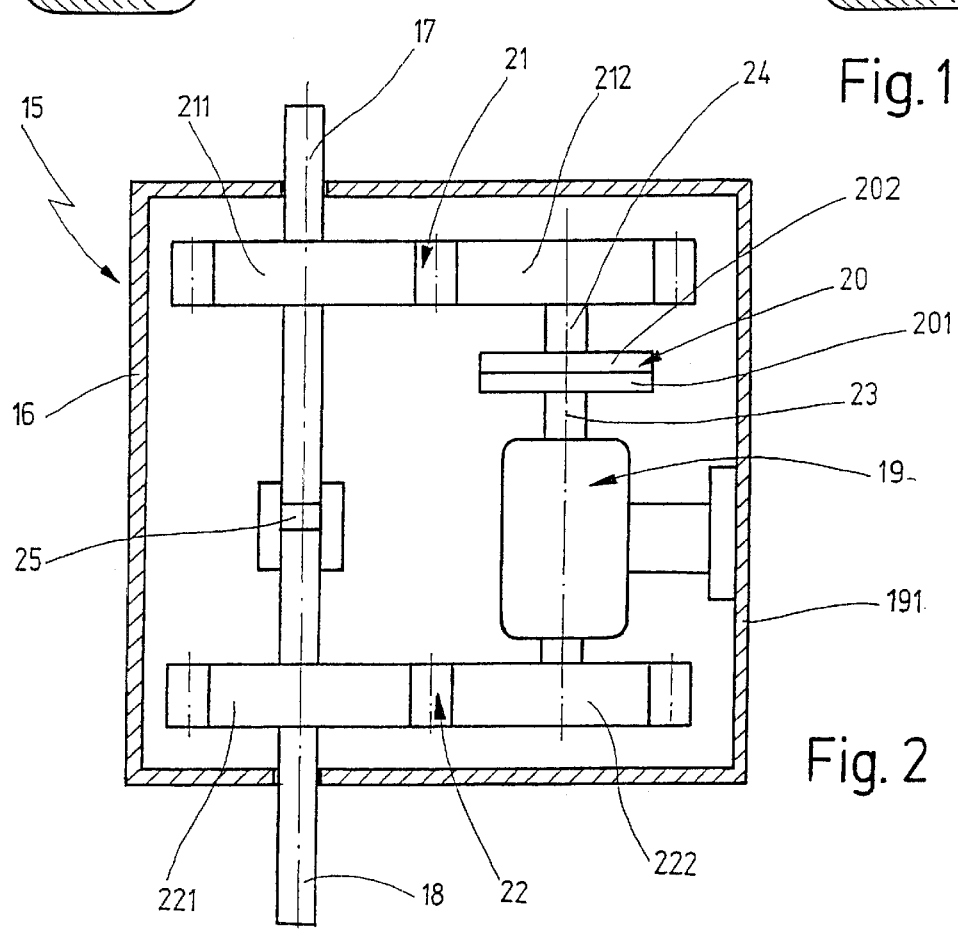
FIG. 2, a longitudinal section through an actuator or steering module in the steering system of FIG. 1.

The steering module 15, which is shown schematically in section in FIG. 2, has a housing 16 with an input shaft 17 and an output shaft 18 that are supported rotatably in the housing 16. The input shaft 17 is connected to the steering shaft 11 in a manner fixed against relative rotation, while the output shaft 18 is coupled to the steering wheel gear 13. An electric motor 19 integrated within the housing 16 is connected, in line with an electromagnetically engageable and disengageable clutch 20, to the input shaft 17 via a first gear 21 and to the output shaft 18 via a second gear 22. Both gears 21, 22 are embodied as gear wheel drives comprising two intermeshing gear wheels 211 and 212, and 221 and 222, respectively, or as belt drives with suitable pulleys and belts guided over them. The gear wheel 211 of the first gear 21 is seated in a manner fixed against relative rotation on the input shaft 17, which represents the drive shaft of the first gear 21, and the gear wheel 221 of the second gear 22 is seated in a manner fixed against relative rotation on the output shaft 18 of the steering module 15, which forms the power takeoff shaft of the second gear 22. The gear wheel 222 of the second gear 22 is seated in manner fixed against relative rotation on the rotor shaft 23 of the electric motor 19, which represents the drive shaft of the second gear 22, while the electromagnetic clutch 20 is disposed between the rotor shaft 23 and the power takeoff shaft 24 of the first gear 21. One clutch part 201 of the clutch 20 is seated in a manner fixed against relative rotation on the rotor shaft 23, and the other clutch part 202 is seated in a manner fixed against relative rotation on the power takeoff shaft 24, onto which the gear wheel 212 of the first gear 21 has also been slipped in a manner fixed against relative rotation. The motor housing 191 of the electric motor 19, which in a known manner receives the stator in a manner fixed against relative rotation and receives the rotor shaft 23, rotationally supported with a surrounding rotor seated on the rotor shaft, in the stator, is retained nonrotatably in the housing 16 of the steering module 15. The electromagnetic clutch 20 is designed such that it is closed when without current and disengages upon application of an exciter current to the electromagnet. The re-engagement of the clutch after the exciter current disappears takes place by means of spring force, specifically solely in a so-called neutral position of the clutch 20 in which the two clutch parts 201, 202 can be locked to one another in detent fashion in a manner fixed against relative rotation.

The steering module 15 also has a coupling point 25, which connects the input shaft 17 and output shaft 18 directly to one another, and which allows a rotary play of approximately 100°, for example, between the two shafts 17, 18.

With the steering module 15 described, two operating modes are achieved:

If the clutch 20 is closed, then the electric motor 19 generates a torque, which is superimposed on the torque generated by driver at the steering wheel 10. Power steering is thus achieved, which allows vehicle guidance with torque superposition.

If the clutch is opened, then the electric motor, on the basis of steering signals at the front wheels 12, superimposes a steering angle, located within the boundary defined by the rotary play of the coupling point 25, without this being perceptible to the driver at the steering wheel 10. In this angle superposition operating mode, variation in the driving dynamics can be done via the steering, which in transverse dynamic critical driving situations leads to an enhancement of vehicle stability and controllability.

To provide the driver with a perceptible resistance at the steering wheel 10 even when the clutch 20 is open, it is possible for a mechanical frictional resistance to be applied to the power takeoff shaft 24 of the first gear 21 simultaneously with the disengagement of the clutch 20.

If the power supply of the clutch 20 and electric motor 19 fails, emergency steering of the vehicle is possible since the input shaft 17 is connected in a manner fixed against relative rotation to the output shaft 18 of the steering gear 13, via the first gear 21, the engaged clutch 20, the rotor shaft 23 of the electric motor 19, and the second gear 22.

The foregoing relates to preferred exemplary embodiments of the invention, it being understood that other embodiments and variants thereof are possible within the spirit and scope of the invention, the latter being defined by the appended claims.

We claim:

1. A steering system for a vehicle, comprising a steering wheel (10), a steering gear (13), and steering module (15) disposed between the steering wheel and steering gear, said steering module including an electric motor (19) including a housing (191), for superimposed steering engagement by said controlled electric motor (19), an input shaft (17) is connected to the steering wheel (10) and an output shaft (18) is connected to the steering gear (13), the electric motor (19) is in engagement, in line with a clutch (20) that is engaged and disengaged, with said input shaft (17) via a first gear (21), and the electric motor is in engagement with said output shaft (18) via a second gear (22).

2. The steering system of claim 1, in which each gear (21, 22) has a drive shaft and a power takeoff shaft, of which the drive shaft of the first gear (21) represents the input shaft (17) of the steering module (15), and the power takeoff shaft of the second gear (22) represents the output shaft (18) of the steering module, and that a rotor shaft (23) of the electric motor (19), with the interposition of the clutch (20), is rigidly connected to the power takeoff shaft (24) of the first gear (21) and to the drive shaft of the second gear (22), and the motor housing (191) that receives a stator is fixed to the steering module housing (16).

3. The steering system of claims 2, in which one clutch part (201, 202) is connected, in a manner fixed against relative rotation, to the rotor shaft (23) and the power takeoff shaft (24) of the first gear (21), respectively, and that the rotor shaft (23) forms the drive shaft of the second gear (22).

4. The steering system of claim 1, in which the clutch (20) is actuatable electromagnetically and is closed when without current.

5. The steering system of claims 2, in which the clutch (20) is actuatable electromagnetically and is closed when without current.

6. The steering system of claim 3, in which the clutch (20) is actuatable electromagnetically and is closed when without current.

7. The steering system of claim 1, in which the clutch (20) has a neutral position, in which the two clutch parts (201, 202) are locked to one another in detent fashion, in a manner fixed against relative rotation.

8. The steering system of claim 2, in which the clutch (20) has a neutral position, in which two clutch parts (201, 202) are locked to one another in detent fashion, in a manner fixed against relative rotation.

9. The steering system of claim 3, in which the clutch (20) has a neutral position, in which two clutch parts (201, 202) are locked to one another in detent fashion, in a manner fixed against relative rotation.

10. The steering system of claim 4, in which the clutch (20) has a neutral position, in which two clutch parts (201, 202) are locked to one another in detent fashion, in a manner fixed against relative rotation.

11. The steering system of claim 5, in which the clutch (20) has a neutral position, in which two clutch parts (201, 202) are locked to one another in detent fashion, in a manner fixed against relative rotation.

12. The steering system of claim 6, in which the clutch (20) has a neutral position, in which two clutch parts (201, 202) are locked to one another in detent fashion, in a manner fixed against relative rotation.

13. The steering system of claim 1, in which the input shaft (17) and the output shaft (18) are connected to one another in a manner partly rotatable counter to one another via a coupling point (25), so that a fixedly defined rotary angle play between the two shafts (17, 18) is allowed.

14. The steering system of claim 2, in which the input shaft (17) and the output shaft (18) are connected to one another in a manner partly rotatable counter to one another via a coupling point (25), so that a fixedly defined rotary angle play between the two shafts (17, 18) is allowed.

* * * * *